(No Model.)
W. WEBSTER, Jr.
PROCESS OF PURIFYING SEWAGE BY ELECTRICITY.
No. 398,101. Patented Feb. 19, 1889.
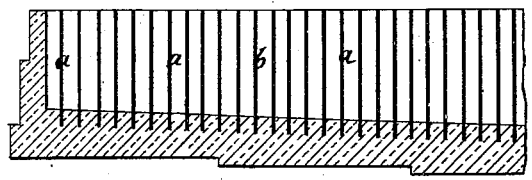
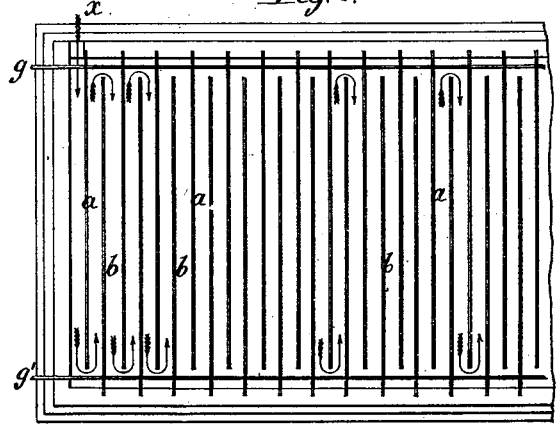
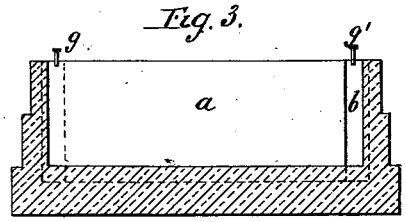  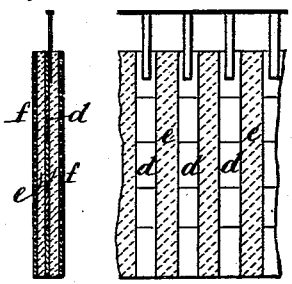
Witnesses:
Inventor:
William Webster Jr.

UNITED STATES PATENT OFFICE.

WILLIAM WEBSTER, JR., OF LEE PARK, LEE, COUNTY OF KENT, ENGLAND.

PROCESS OF PURIFYING SEWAGE BY ELECTRICITY.

SPECIFICATION forming part of Letters Patent No. 398,101, dated February 19, 1889.

Application filed December 22, 1887. Serial No. 258,724. (No model.) Patented in England January 27, 1887, No. 1,333; in France December 9, 1887, No. 187,497; in Cape of Good Hope January 28, 1888, No. 436; in Natal February 2, 1888; in Victoria February 8, 1888, No. 5,615; in New South Wales February 10, 1888, No. 495; in South Australia February 10, 1888, No. 961; in Tasmania February 12, 1888, No. 540/10; in New Zealand February 20, 1888, No. 2,817, and in India April 13/28, 1888, No. 16/522.

*To all whom it may concern:*

Be it known that I, WILLIAM WEBSTER, Jr., a citizen of England, residing at Lee Park, Lee, in the county of Kent, England, have invented new and useful Improvements in the Treatment of Sewage and other Impure Water by Electrolytic Action for the Purification thereof, (for which I obtained a patent in Great Britain, dated January 27, 1887, No. 1,333; France, dated December 9, 1887, No. 187,497; Cape of Good Hope, dated January 28, 1888, No. 436; Natal, dated February 2, 1888; Victoria, dated February 8, 1888, No. 5,615; New South Wales, dated February 10, 1888, No. 495; South Australia, dated February 10, 1888, No. 961; Tasmania, dated February 12, 1888, No. 540/10; New Zealand, dated February 20, 1888, No. 2,817, and India, dated April 13/28, 1888, No. 16/522,) of which the following is a specification.

My invention has for its object the treatment of sewage and other impure water by electrolytic action in such manner as both to precipitate the solid matter suspended therein and to oxidize or otherwise disinfect the albuminoids and other organic impurities held in suspension or solution therein.

The invention consists, mainly, in subjecting the liquid while flowing through reservoirs or channels to the electrolytic action of positive and negative electrodes of iron having very extended surfaces. Nascent ammonia will by this means be evolved at the negative electrode, producing an alkaline reaction which effects the precipitation of the solid suspended matter, while at the positive pole nascent oxygen and chlorine are evolved, producing an acid reaction, whereby the organic impurities held in suspension or solution are readily decomposed and purified. The formation of chlorine at the positive electrodes is due to the presence of large quantities of chlorides, &c., in the sewage. If this action is therefore carried on long enough, the sewage will be converted into a disinfecting-liquor. At the negative pole ammonia and alkalies are set free, and directly an alkaline reaction is shown in the sewage the precipitation of the solid matter takes place, together with part of the calcium and magnesium salts, &c.

In using iron positive electrodes, chlorites, or chlorides of iron are formed at the positive pole, and are partly precipitated by the alkaline reaction at the negative electrode in the form of hydrated oxide, which carries down with it the suspended organic matter.

The nascent chlorine produced as above described will have much greater efficiency than the chlorine present in chloride of lime, and the nascent oxygen will also have much more effect on the organic matter in the form of albuminoids than the oxygen of the atmosphere.

Should the liquid treated be insufficiently charged with chlorides, I in some cases add chlorides thereto in order to produce the requisite amount of nascent chlorine, and for this purpose at sea-ports I employ sea-water. The electrical current required is necessarily fluctuating in amount, according to the amount of sewage to be treated at any one time. The electro-motive force would vary from ten volts upward. It may be found desirable to alternate the current by means of a suitable switch, so as to produce a uniform wear of both sets of electrodes.

It has heretofore been proposed to subject sewage and impure water to electrolytic action by means of electrodes of non-oxidizable material; but I have found that it is essentially necessary for obtaining a practical result of any value that iron electrodes should be used according to my present invention.

To successfully treat sewage for its purification and precipitation, it is absolutely necessary that a metallic salt of an oxidizable metal—such as iron hypochlorite or perchloride or protochloride—should be formed at the positive pole; otherwise it is impossible to remove the suspended matter. A flocculent precipitate of hydrated oxide of iron is by this means at once produced, which effectually carries down the suspended matter. By using iron for the negative electrodes, on the other hand, instead of carbon, which would be the only other practically available material, the great advantages are gained that, whereas with carbon plates the alkalies produced get into the pores of the carbon, crystallize, and frequently break it up, the iron electrodes, besides not being subject to this disadvantage, conduct the current much better, so as at once to allow the alkalies set free to act upon the sewage and the iron salts produced at the positive pole. The pores of the carbon electrodes would also become clogged with the iron oxide formed, and the nascent hydrogen given off in the pores of the carbon attacks the oxide and reduces it to the metallic state, resulting in a considerable waste of power.

In some cases the positive and negative electrodes may be separated by a porous partition, so that there is a body of sewage flowing in contact only with the positive electrode, and being subjected to an oxidizing action, and a second body flowing in contact only with the negative electrode and consequently subjected to the precipitating action, the two bodies being afterward either united together or kept separate from each other.

The apparatus which I employ for the purposes of my invention may be variously constructed.

In the accompanying drawings, Figure 1 is a plan of a tank or reservoir, showing the electrodes arranged therein. Fig. 2 is a vertical longitudinal section through the same. Fig. 3 is a vertical cross-section through it. Fig. 4 is a detail sectional view showing how the negative electrodes may be fitted to place. According to one arrangement I construct a reservoir in which are arranged electrodes extending alternately from opposite sides transversely across the reservoir or tank, so as to form this into a long narrow zigzag passage in the same, as indicated diagrammatically in Figs. 1, 2, and 3 of the accompanying drawings, which show respectively a part plan, part longitudinal section, and a cross-section of the reservoir.

The positive electrodes $a\ a\ a$ are fixed to the one side of the reservoir and extend to within a certain distance of the other side, while the negative electrodes $b$ are fixed to this side and extend to within a certain distance of the first-named side, all the electrodes being fixed either permanently or in a removable manner to the floor of the reservoir, thus forming a closed zigzag passage between them, into which the liquid to be treated enters at $x$, and in which it gradually flows along to the opposite end, where it is discharged, the bottom of the entire zigzag passage being made with a sufficient inclination to facilitate such flow at a slow velocity.

The positive and negative electrodes are built up of iron plates in any suitable manner, being either bedded into the bottom of the tank, as shown at $b$, Fig. 4, or they may be fitted at the bottom into sockets, as at $c$, of any suitable material, fixed in the bottom, so that the electrodes can be withdrawn and replaced when required. The electrodes being connected by conductors $g\ g'$, respectively, to the positive and negative poles of a dynamo-electric machine or other generator of electricity, the sewage or other impure water in passing in contact therewith will, as before stated, be acted upon by the nascent ammonia generated at the negative electrodes $b$ and by the nascent oxygen and chlorine at the positive electrodes $a$, and, the passage between these being comparatively narrow and of considerable length, it will be evident that by the time the liquid arrives at the discharge-opening all particles thereof will have been effectually brought in contact with both sets of electrodes and subjected to the above-described precipitating and purifying action.

If necessary, an outlet closed by a valve may be provided at the one end of each length of the zigzag passage, through which the accumulated solid deposit may be discharged from time to time.

Having thus described the nature of this invention, and the best means I know for carrying the same into practical effect, I claim—

The process herein described of purifying sewage and other impure water, which consists in passing the same in contact with electrically-excited positive and negative electrodes of iron, whereby salts of iron are produced at the positive electrode, which, in reacting with the alkalies produced at the negative electrode, form a flocculent precipitate of ferrous hydrated oxide, which, together with the gases generated, effect the precipitation of the solid matter and the purification of the impurities held in solution.

In testimony whereof I have signed my name to this specification, in the presence of two subscribing witnesses, this 2d day of December, A. D. 1887.

WILLIAM WEBSTER, JR.

Witnesses:
CHAS. D. ABEL,
 *Patent Agent.*
JNO. P. M. MILLARD,
*Clerk to Messrs. Abel & Imray, Consulting Engineers & Patent Agents, 28 Southampton Buildings, London, W. C.*